(12) United States Patent
McCullough et al.

(10) Patent No.: US 8,985,515 B2
(45) Date of Patent: Mar. 24, 2015

(54) MULTI-DIRECTIONAL LOAD JOINT SYSTEM

(75) Inventors: John R. McCullough, Weatherford, TX (US); David Gordon Carlson, North Richland Hills, TX (US); James Donn Hethcock, Colleyville, TX (US); Paul K. Oldroyd, Azle, TX (US); Carl A. May, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/641,369

(22) PCT Filed: Dec. 28, 2010

(86) PCT No.: PCT/US2010/062211
§ 371 (c)(1),
(2), (4) Date: Oct. 15, 2012

(87) PCT Pub. No.: WO2012/091695
PCT Pub. Date: Jul. 5, 2012

(65) Prior Publication Data
US 2013/0026297 A1    Jan. 31, 2013

(51) Int. Cl.
*B64C 1/06* (2006.01)
*B64C 1/12* (2006.01)
(Continued)

(52) U.S. Cl.
CPC ............... *B64C 1/12* (2013.01); *B29C 65/5078* (2013.01); *B29D 99/001* (2013.01); *B64C 1/06* (2013.01); *F16B 5/01* (2013.01); *B29C 65/5057* (2013.01); *B29C 65/5085* (2013.01); *B29C 65/562* (2013.01); *B29C 66/1122* (2013.01); *B29C 66/1142* (2013.01); *B29C 66/1162* (2013.01); *B29C 66/1282* (2013.01); *B29C 66/12881* (2013.01); *B29C 66/43441* (2013.01); *B29C 66/721* (2013.01); *B29C 66/72525* (2013.01);
(Continued)

(58) Field of Classification Search
USPC .......................... 244/131, 132, 119; 29/897.3
See application file for complete search history.

(56) References Cited

U.S. PATENT DOCUMENTS 3,784,021 A    1/1974    Mark
3,819,198 A    6/1974    Groves
(Continued)

FOREIGN PATENT DOCUMENTS

WO    02/16784 A2    2/2002
WO    03/020496 A1    3/2003

OTHER PUBLICATIONS

International Search Report and the Written Opinion of the International Searching Authority mailed by ISA/USA, U.S. Patent and Trademark Office on Mar. 1, 2011 for International Patent Application No. PCT/US2010/062211.
(Continued)

*Primary Examiner* — Tien Dinh
*Assistant Examiner* — Keith L Dixon
(74) *Attorney, Agent, or Firm* — James E. Walton; Damon R. Hickman

(57) ABSTRACT

A structural joint includes a first member having a first base portion and a first leg portion. The structural joint further includes a second member having a second base portion and a second base portion. The first base portion and the second base portion are coupled together at an overlapping portion. The first leg portion and the second leg portion form a cavity for structurally coupling to a structural member.

19 Claims, 6 Drawing Sheets

(51) Int. Cl.
*B29C 65/50* (2006.01)
*B29D 99/00* (2010.01)
*F16B 5/01* (2006.01)
B29C 65/56 (2006.01)
B29C 65/00 (2006.01)
B29L 31/30 (2006.01)
B64C 1/00 (2006.01)

(52) U.S. Cl.
CPC ..... *B29C 66/8416* (2013.01); *B29L 2031/3076* (2013.01); *B64C 2001/0072* (2013.01); *B29C 65/5021* (2013.01); *Y02T 50/433* (2013.01); *Y02T 50/43* (2013.01)
USPC ........................................................ 244/131

(56) References Cited

U.S. PATENT DOCUMENTS

| | | | |
|---|---|---|---|
| 4,177,306 A | 12/1979 | Schulz et al. | |
| 4,331,495 A * | 5/1982 | Lackman et al. | 156/93 |
| 4,637,632 A | 1/1987 | Rubash et al. | |
| 4,671,470 A * | 6/1987 | Jonas | 244/119 |
| 5,183,223 A | 2/1993 | Cornax | |
| 5,273,806 A | 12/1993 | Lockshaw et al. | |
| 5,308,675 A | 5/1994 | Crane et al. | |
| 5,476,704 A | 12/1995 | Kohler | |
| 5,487,930 A | 1/1996 | Lockshaw et al. | |
| 5,508,085 A | 4/1996 | Lockshaw et al. | |
| 5,580,622 A | 12/1996 | Lockshaw et al. | |
| 5,616,376 A | 4/1997 | Lockshaw et al. | |
| 5,881,517 A * | 3/1999 | Prince et al. | 52/238.1 |
| 5,944,286 A * | 8/1999 | Morris et al. | 244/131 |
| 6,374,570 B1 | 4/2002 | McKague, Jr. | |
| 6,502,788 B2 * | 1/2003 | Noda et al. | 244/123.3 |
| 6,520,706 B1 | 2/2003 | McKague, Jr. et al. | |
| 6,712,099 B2 | 3/2004 | Schmidt et al. | |
| 6,718,713 B2 | 4/2004 | McKague, Jr. et al. | |
| 6,749,155 B2 | 6/2004 | Bergmann | |
| 6,835,261 B2 | 12/2004 | Schmidt | |
| 6,849,150 B1 | 2/2005 | Schmidt | |
| 6,863,767 B2 | 3/2005 | Bersuch et al. | |
| 6,945,727 B2 | 9/2005 | Christman et al. | |
| 7,205,066 B1 | 4/2007 | Hammi et al. | |
| 7,238,409 B1 | 7/2007 | Peterson et al. | |
| 7,244,487 B2 | 7/2007 | Brantley et al. | |
| 7,393,488 B2 | 7/2008 | Grose et al. | |
| 7,521,108 B2 * | 4/2009 | Franklin et al. | 428/119 |
| 7,541,083 B2 | 6/2009 | Grose et al. | |
| 7,625,623 B2 | 12/2009 | Grose et al. | |
| 7,686,905 B2 * | 3/2010 | Ackerman et al. | 156/94 |
| 7,690,164 B2 | 4/2010 | Walker et al. | |
| 8,016,230 B2 * | 9/2011 | Fogarty et al. | 244/117 R |
| 8,128,028 B2 * | 3/2012 | Grillos | 244/119 |
| 8,282,042 B2 * | 10/2012 | Parikh et al. | 244/132 |
| 2002/0553175 | 5/2002 | McKague, Jr. et al. | |
| 2003/0066589 A1 * | 4/2003 | Benson et al. | 156/92 |
| 2006/0113450 A1 | 6/2006 | Kilwin et al. | |
| 2006/0113451 A1 | 6/2006 | Kilwin et al. | |
| 2008/0295334 A1 * | 12/2008 | Kulesha | 29/897.2 |

OTHER PUBLICATIONS

Extended European Search Report in related European patent application No. 10861307.6, mailed Aug. 8, 2013, 7 pages.

Office Action in related European patent application No. 10861307.6, mailed Apr. 14, 2014, 5 pages.

Office Action dated Aug. 13, 2014 from counterpart CA App. No. 2,820,004.

Office Action dated Nov. 26, 2014 from counterpart European Patent App. No. 10861307.6 issued from the European Patent Office.

* cited by examiner

MULTI-DIRECTIONAL LOAD JOINT SYSTEM

TECHNICAL FIELD

The system of the present application relates structural joints. In particular, the system of the present application relates to composite structural joints.

DESCRIPTION OF THE PRIOR ART

One typical structural joint includes mechanically fastened flanges. For example, a prior art mechanical system 101 is illustrated in FIG. 1. A first structural member 103 is coupled to a second structural member 105 via fasteners 107. System 101 depends on fasteners 107 for load transfer between member 103 and member 105. The installation of fasteners 107 is often labor intensive due the drilling and deburring of the fastener holes. Furthermore, fasteners 107 typically create stress concentrations around the fasteners holes, thus often causing the size, thickness, and weight of members 103 and 105 to increase. Fasteners 107 may also increase the possibility of corrosion. Mechanical fasteners also require periodic inspection to insure that they haven't inadvertently become unfastened.

Another conventional system 201 is illustrated in FIG. 2. System 201 includes a first member 203 coupled to a second member 207 via an adapter 205. Adapter 205 is typically adhesively bonded or mechanically fastened to second member 207. First member 203 is positioned within a slot in adapter 205. Adhesive 209 is used in the slot to create a bond between adapter 205 and first member 203. System 201 includes several deficiencies, including the difficulty in preparing the inside surfaces of the slot for adhesive. Typically, the bonding surfaces must be thoroughly cleaned from contaminates through a sanding and cleaning process. The geometry of the slot makes it difficult and time consuming to prepare slot for adhesive bonding. Furthermore, the geometry of the slot in adapter 205 typically limits the type of adhesive to paste adhesives having thick bond lines. Another disadvantage of system 201 is that when adapter 205 is a cured and rigid structure, tolerance requirements typically dictate that the slot be large in order to accommodate the situation when first member 203 is on the high thickness side of the tolerance. As such, a larger slot in adapter 205 requires more adhesive, thus adding weight and expense. Furthermore, the fixed geometry of the slot typically prevents the application of positive bonding pressure between first member 203 and both inside surfaces of the slot. Another disadvantage of system 201 is that first member 203 must be translated into the slot of adapter 205, thus requiring space in order to position member 203. This is particularly problematic in closed geometry structure, such as when second member 207 is an enclosed aircraft fuselage skin, and first member 203 is an aircraft bulkhead structure.

Although the developments in structural joints have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
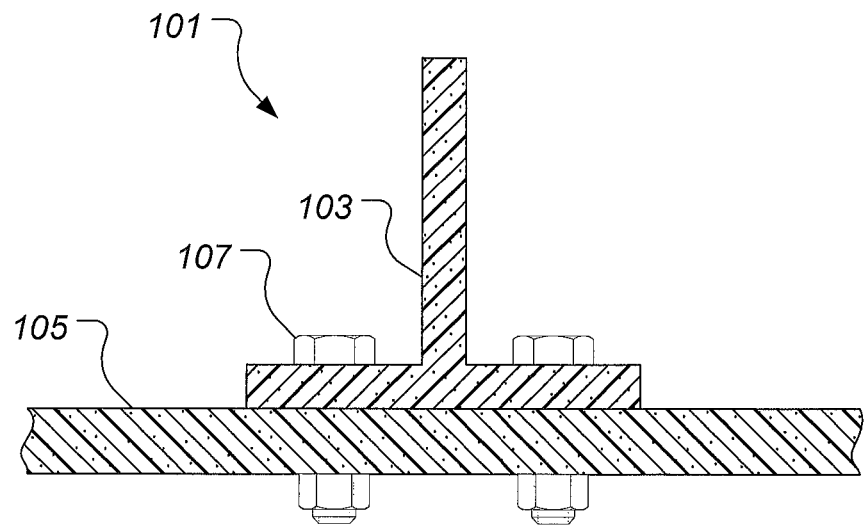
FIG. 1 is a cross-sectional view of a prior art structural system.
Figure 2:
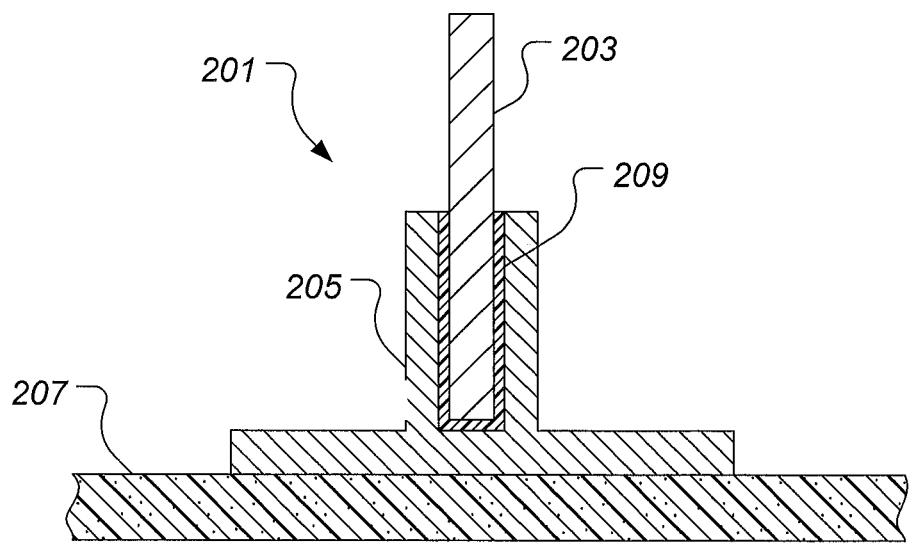
FIG. 2 is a cross-sectional view of another prior art structural system.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 3:
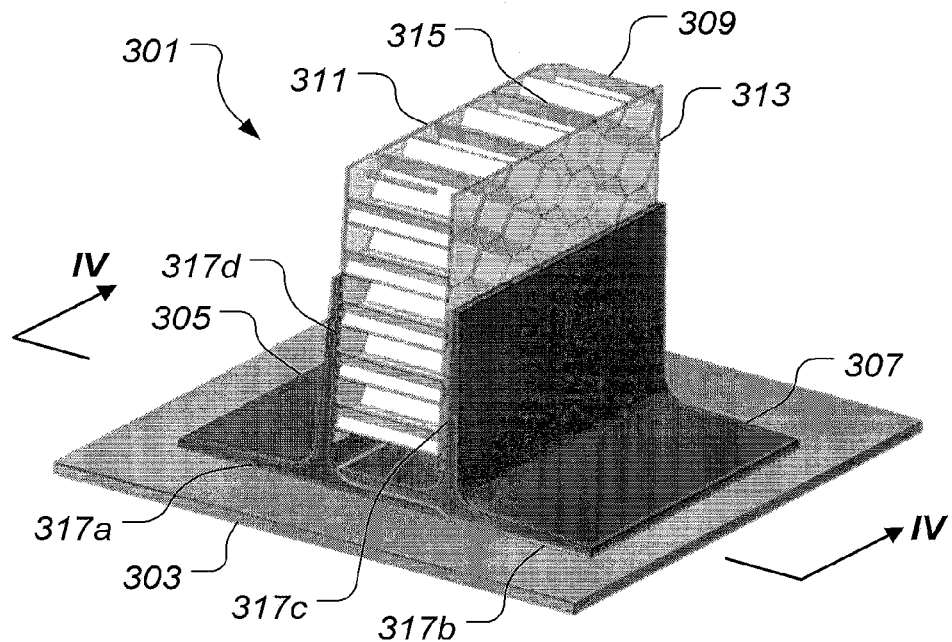
FIG. 3 is a perspective view of a structural system according to the preferred embodiment of the present application.
Figure 4:
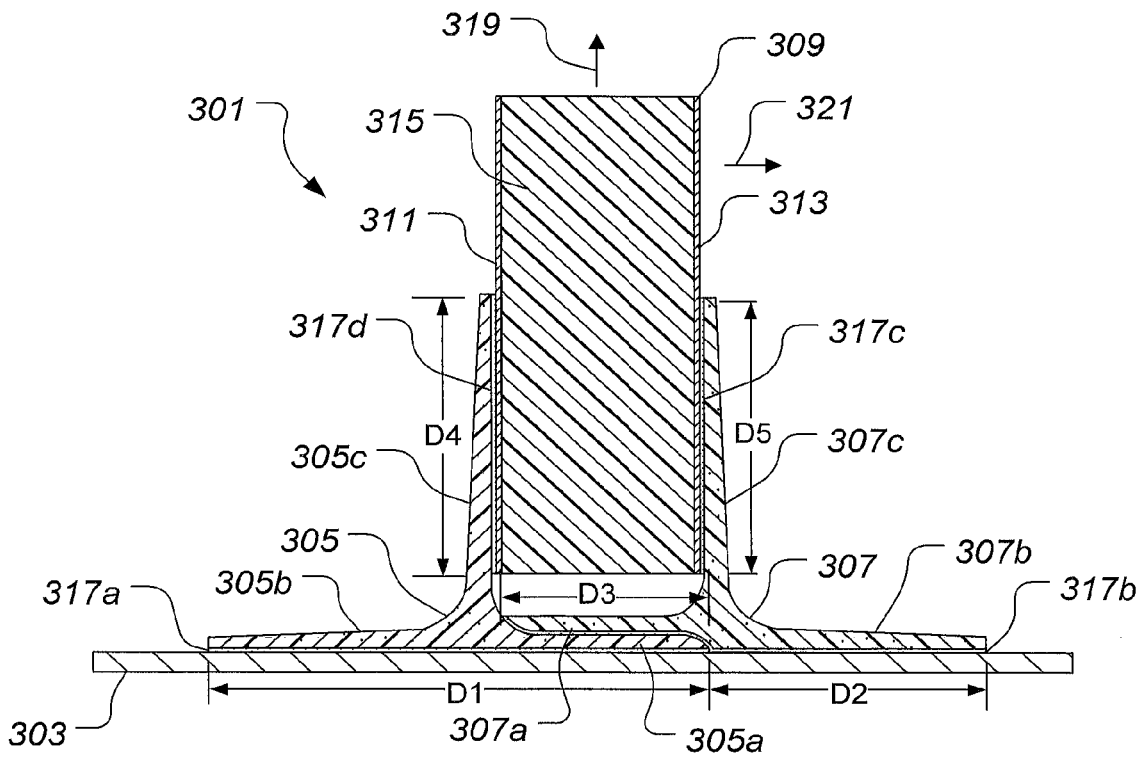
FIG. 4 is a cross-sectional view of the structural system, according to the preferred embodiment of present application, taken along the section lines IV-IV, shown in FIG. 3.

Referring to FIGS. 3 and 4, a joint system 301, according to the preferred embodiment of the present application, includes a first member 305 and a second member 307. First member 305 and a second member 307 are configured for attaching a panel 309 to a skin 303. Skin 303 is typically of a composite material, but skin 303 may be any material, such as a metal. Skin 303 is preferably a skin on aircraft; however, skin 303 may be any structural component on a variety of structural bodies. For example, skin 303 may be a panel in a structural assembly. Further, skin 303 may be a structure on a satellite, train, bus, automobile, watercraft, wind turbine blade, shelter, mobile home, and motor home, to name a few. It should be appreciated that even though skin 303 is depicted as a relatively flat surface, skin 303 may be of a variety of contours and thickness. For example, skin 303 may have an airfoil shape. Furthermore, panel 309 preferably includes composite construction with a first face 311, a second face 313, and a core 315 bonded between first face 311 and second face 313. Preferably, panel 309 is completely cured prior to installation with system 301. It should be appreciated that panel 309 may be any type of structure, including solid material. For example, panel 309 may be void of core material so as to include only layers of composite material. Furthermore, panel 309 may be a variety of structures, such as a bulkhead, spar, rib, or any support configured to carry a structural load.

System 301 includes a first member 305 and a second member 307, which are configured to be used in combination in the attachment of panel 309 to skin 303. First member 305 and second member 307 are preferably rigid structures. Accordingly, first member 305 and second member 307 are preferably composite structures that are cured prior to installation. Furthermore, first member 305 and second member 307 are preferably formed from a molding process to produce a composition of a plurality of fibers disposed in a resin matrix. However, it should be appreciated that first member 305 and second member 307 may alternatively be of any material capable of carrying the predicted loads, such as metal, plastic, wood, to name a few. First member 305 is preferably of a "T" shaped cross section having an inner base portion 305a, outer base portion 305b, and a leg portion 305c. Any of inner base portion 305a, outer base portion 305b, and leg portion 305c may be tapered to minimize stresses in the adhesive layer between adjoining members. First member 305 is attached to skin 303, preferably with an adhesive layer 317a located between skin 303 and base portions 305a and 305b, along a bonding surface D1. Leg portion 305c extends from base portions 305a and 305b at an angle that aligns with the geometry of panel 309. It should be appreciated that even though leg portion 305c is depicted as having an approximately 90 degree orientation to base portions 305a and 305b, first member 305 may be configured with leg portion 305c having any angle between 0 degrees and 180 degrees relative to base portions 305a and 305b. First member 305 is preferably adhesively bonded to skin 303 during installation, as described further herein. Furthermore, first member 305, as well as second member 307, may include a wide variety of features, such as fillets and chamfers, to name a few.

Second member 307 is preferably of a "T" shaped cross section having an inner base portion 307a, an outer base portion 307b, and a leg portion 307c. Any of inner base portion 307a, outer base portion 307b, and leg portion 307c may be tapered to minimize stresses in the adhesive layer between adjoining members. Inner base portion 307a is configured to at least partially overlap inner base portion 305a of first member 305. Leg portion 307c extends from base portions 307a and 307b at an angle that aligns with the geometry of panel 309. It should be appreciated that even though leg portion 307c is depicted as having an approximately 90 degree orientation to base portions 307a and 307b, second member 307 may be configured with leg portion 307c having any angle between 0 degrees and 180 degrees relative to base portions 307a and 307b. Outer base portion 307b of second member 307 is adhesively bonded to skin 303, along a bonding surface D2, with an adhesive layer 317b. Inner base portion 307a of second member 307 is bonded to inner base portion 305a of first member 305, along a bonding surface D3, also with adhesive layer 317b.

Panel 309 is preferably bonded to leg portion 305c of first member 305 with an adhesive layer 317d, along a bonding surface D4. Similarly, panel 309 is preferably bonded to leg portion 307c of second member 307 with an adhesive layer 317c, along a bonding surface D5.

Adhesive layers 317a-d are preferably formed from a high strength adhesive film, such as AF-163, marketed by 3M. However, adhesive layers 317a-d may be formed from any adhesive suitable for creating sufficient bond strength. For example, adhesive layers 317a-d may be formed from a paste adhesive, such as Magnobond 6398, marketed by Magnolia Plastics. Adhesive layers 317a-d may require high temperature cure, or may alternatively only require room temperature cure.

Because inner base portion 305a and inner base portion 307a are overlapping and bonded together, structural loading capabilities of system 301 are optimized. For example, if panel 309 were to experience a load in one or more load directions 319 and 321, then inner base portion 305a and inner base portion 307a act to transfer the load into skin 303. Without inner base portion 305a and inner base portion 307a, first member 305 and second member 307 may have a tendency to separate from skin 303.

Figure 6:
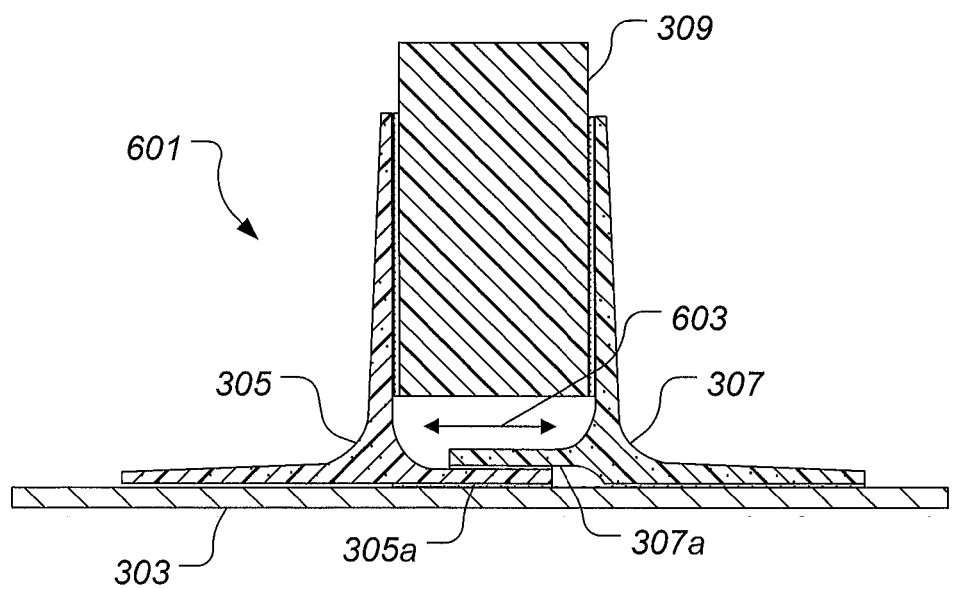
FIG. 6 is a cross-sectional view of a structural system, according to an alternative embodiment of present application.

Referring briefly to FIG. 6, a system 601 represents an alternative embodiment of system 301. System 601 is substantially similar to system 301 except inner base portion 305a and inner base portion 307a are shortened in order to allow for greater tolerance variance in panel 309. During installation, inner base portion 305a and inner base portion 307a are configured so that first member 305 and second member 307 can be selectively located along a direction 603 to accommodate a variety of panel 309 thicknesses. It is preferable that inner base portion 305a and inner base portion 307a are approximately parallel to each other; however, alternative embodiments may include first member 305 and second member 307 that are of an angle to each other. It should be appreciated that inner base portion 305a and inner base portion 307a may be of a wide variety of lengths, thicknesses, and orientations. Furthermore, inner base portion 305a and inner base portion 307a may include a wide variety of features, such as fillets and chamfers, to name a few.

Figure 5:
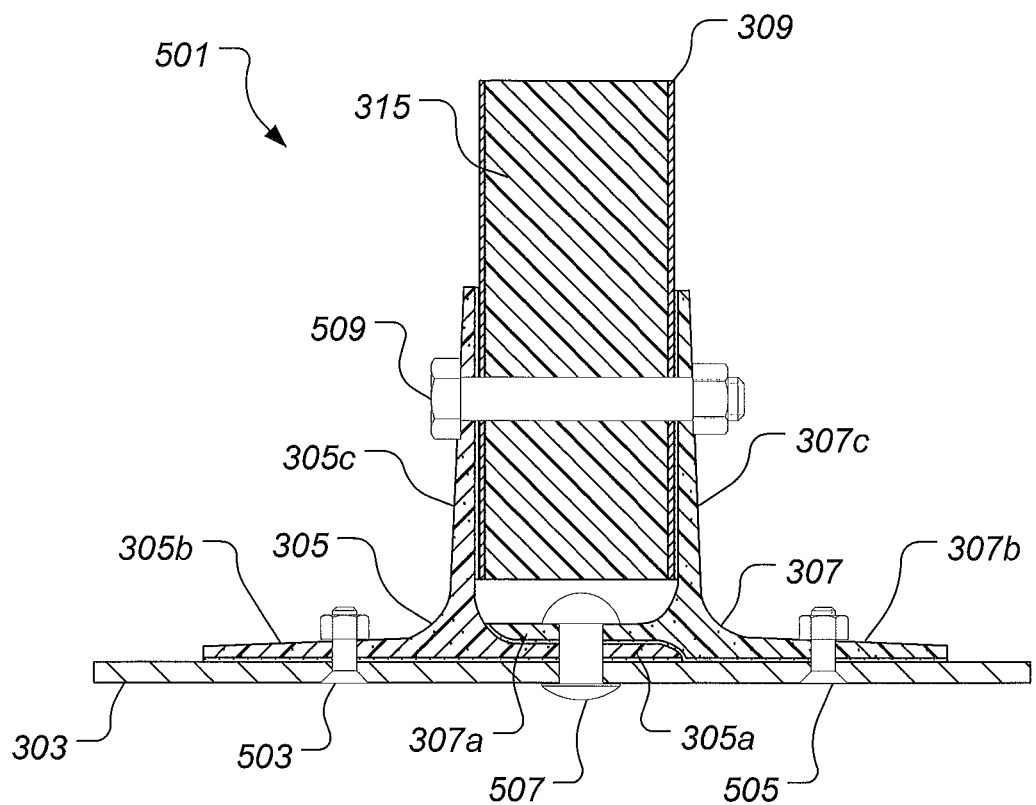
FIG. 5 is a cross-sectional view of a structural system, according to an alternative embodiment of present application.

Referring briefly to FIG. 5, a system 501 represents an alternative embodiment of system 301. System 501 is substantially similar to system 301, except fasteners are included. Fasteners may be used to provide redundancy to the adhesive layers. Alternatively, fasteners may be used for repair purposes. A fastener 503 may be used between outer portion 305b and skin 303. Similarly, a fastener 505 may be used between outer portion 307b and skin 303. A fastener 507, which is preferably a blind fastener, may be used between inner portion 305a, inner portion 307a, and skin 303. Further, a fastener 509 may be installed between leg portion 305c, leg portion 307c, and panel 309. It should be appreciated that a variety of fasteners and fastener quantities may be used in system 501. An alternative embodiment may employ fasteners in lieu of adhesive layers.

Referring again to FIGS. 3 and 4, installation of system 301 is preferably a staged procedure which includes first locating and bonding first member 305 to skin 303. During this step, bonding surfaces are prepared by removing paint and other contaminates from surfaces that will be in contact with adhesive. Adhesive 317a is applied, first member 305 is located on skin 303, and adhesive 317a is cured. During this step, pressure may be applied to first member 305 to ensure a quality bond between first member 305 and skin 303. The location of first member 305 predominately dictates the final location of panel 309 and second member 307. As such, the exact location of first member 305 may be determined by a tool. After first member 305 is bonded to skin 303, panel 309 and second member 307 are prepared for bonding. Access to surfaces requiring bond preparation is ample due to first member 305 and second member 307 being separate parts. Adhesive layers 317b-d are applied. Then, second member 307 and panel 309 are located and assembled. Adhesive layers 317b-d are cured, during which, pressure may be applied. Pressure may be applied through a variety of means, such as through a vacuum bag and pump or an inflatable bladder, to name a few. Alternatively, one or more fasteners (shown in FIG. 5), or other mechanical systems, may be used. Selectively applying pressure to adhesive layers 317a-d during curing increases the quality of the bond, as well as allows for the customization of bond line thickness in accordance with the specific adhesive requirements. During this step, first member 305 acts as a "stop" so that the location of member 305, second member 307, and panel 309 remain in the desired location during the curing of adhesive layers 317b-d.

Still referring to FIGS. 3 and 4, installation of system 301 is alternatively conducted in a single stage process. In a single stage process, first member 305, second member 307, and panel 309 are all bonded in a single process. One or more tools may be used to locate and assemble first member 305, second member 307, and panel 309. Additionally, one or more tools may be used to aid in applying pressure to system 301.

Figure 7:
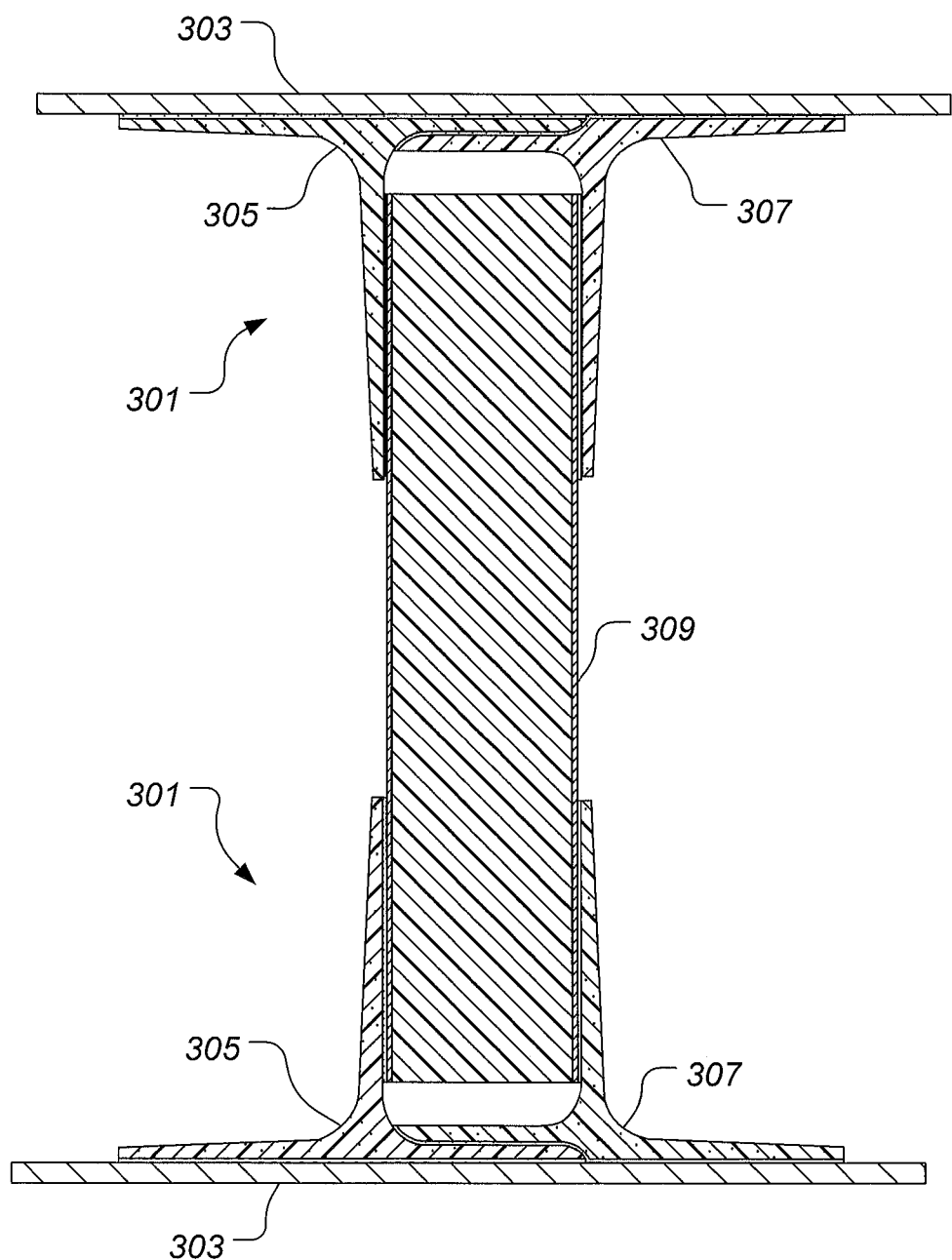
FIG. 7 is a cross-sectional view of an exemplary configuration of multiple structural systems, according to the preferred embodiment of present application.

Referring now to FIG. 7, multiple systems 301 may be used in combination for structurally supporting panel 309. Furthermore, skins 303 may be an upper and lower airfoil skin in a wingbox. The wingbox represents an enclosed structure wherein upper and lower skins 303 are fixed at a certain distance. Each system 301 is configured so that panel 309 may be located between first member 305 and second member 307 of each system 301 through an assembly sequence as disclosed herein. For example, panel 309 may be located by sliding panel in a direction approximately parallel with the surface of skin 303. Such a configuration prevents the need for panel 309 to be positioned from a direction normal to skin 303, as required by some conventional systems.

Figure 8:
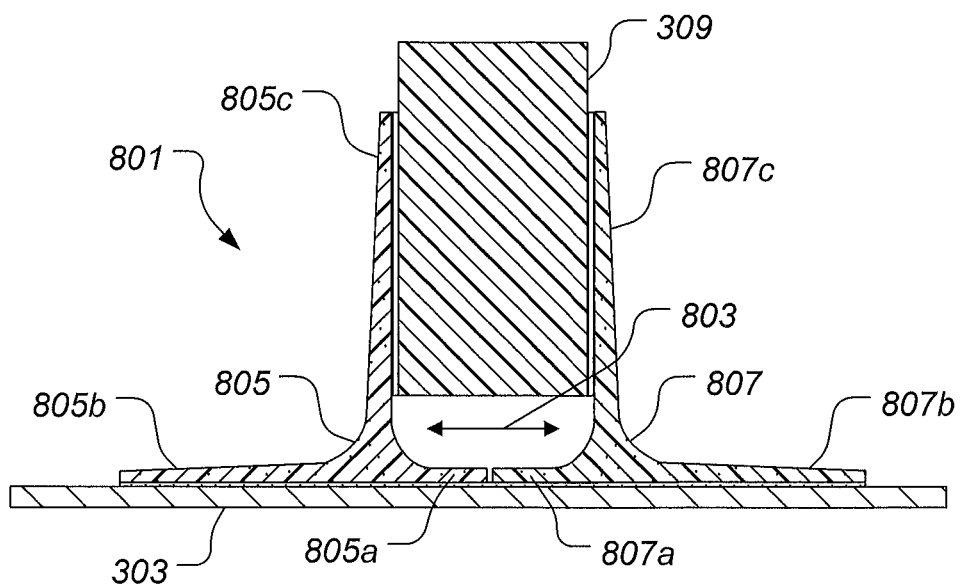
FIG. 8 is a cross-sectional view of a structural system, according to an alternative embodiment of present application.

Referring to FIG. 8, a system 801 represents an alternative embodiment of system 301. System 801 includes a first member 805 and a second member 807 which are each preferably "T" shaped. First member 805 includes an inner base portion 805a, an outer base portion 805b, and a leg portion 805c. Similarly, second member 807 includes an inner base portion 807a, an outer base portion 807b, and a leg portion 807c. First member 805 is bonded to skin 303 with an adhesive layer between inner base portion 805a and skin 303, as well as between outer base portion 805b and skin 303. Similarly, second member 807 is bonded to skin 303 with an adhesive layer between inner base portion 807a and skin 303, as well as between outer base portion 807b and skin 303. During installation, inner base portion 805a and inner base portion 807a are configured so that first member 805 and second member 807 can be selectively located along a direction 803 to accommodate a variety of panel 309 thicknesses. First member 805 and second member 807 may be configured so that first member 805 and second member are identical parts, thus decreasing the variety of parts that need to be stocked prior to installation. It should be appreciated that first member 805 and second member 807 may be of a wide variety of lengths, thicknesses, and orientations.

Figure 9:
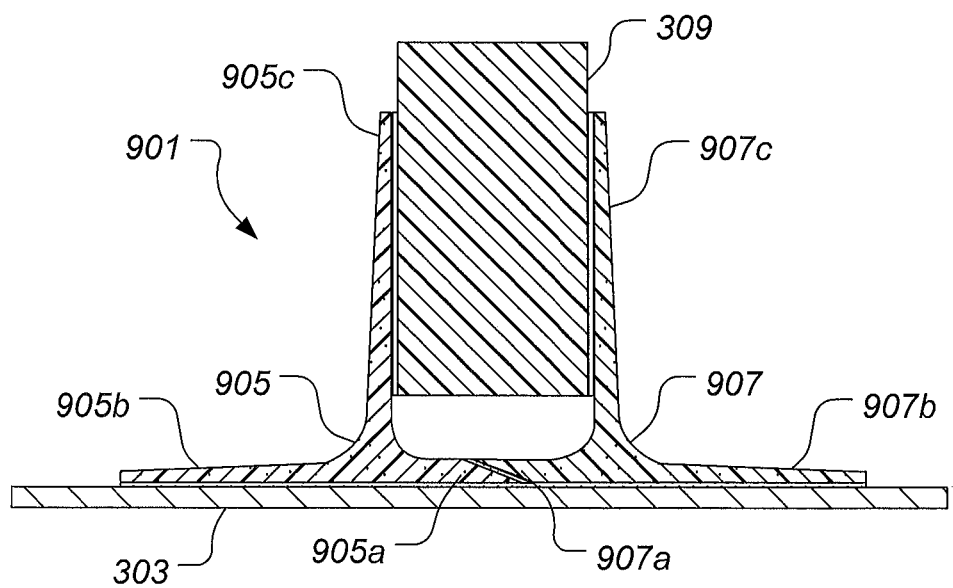
FIG. 9 is a cross-sectional view of a structural system, according to an alternative embodiment of present application.

Referring to FIG. 9, a system 901 represents an alternative embodiment of system 301. System 901 includes a first member 905 and a second member 907 which are each preferably "T" shaped. First member 905 includes an inner base portion 905a, an outer base portion 905b, and a leg portion 905c. Similarly, second member 907 includes an inner base portion 907a, an outer base portion 907b, and a leg portion 907c. System 901 is similar to system 301 except inner base portion 905a and inner base portion 907a partially overlap at a scarfed portion. Furthermore, Inner base portion 907a is bonded to inner base portion 905a and skin 303. It should be appreciated that first member 905 and second member 907 may be of a wide variety of lengths, thicknesses, and orientations. Furthermore, first member 905 and second member 907 may include a wide variety of features, such as fillets and chamfers, to name a few.

Figure 10:
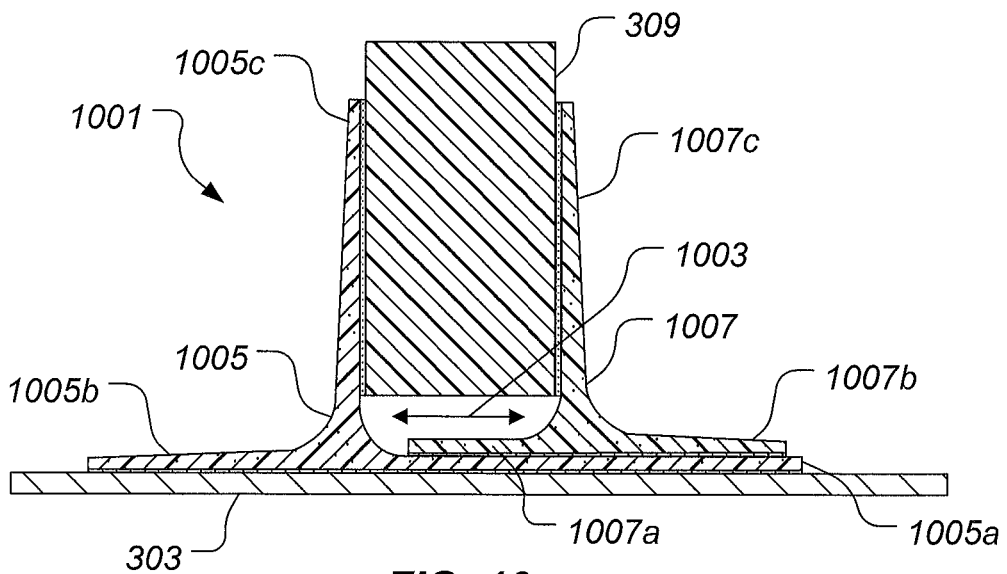
FIG. 10 is a cross-sectional view of a structural system, according to an alternative embodiment of present application.

Referring to FIG. 10, a system 1001 represents an alternative embodiment of system 301. System 1001 includes a first member 1005 and a second member 1007 which are each preferably "T" shaped. First member 1005 includes an inner base portion 1005a, an outer base portion 1005b, and a leg portion 1005c. Similarly, second member 1007 includes an inner base portion 1007a, an outer base portion 1007b, and a leg portion 1007c. First member 1005 is bonded to skin 303 with an adhesive layer between inner base portion 1005a and skin 303, as well as between outer base portion 1005b and skin 303. Second member 1007 is bonded to first member 1005 with an adhesive layer between inner base portion 1007a and inner base portion 1005a, as well as between outer base portion 1007b and inner base portion 1005a. During installation, first member 1005 and second member 1007 can be selectively located along a direction 1003 to accommodate a variety of panel 309 thicknesses. Fasteners may be used in lieu of, or supplemental to the adhesive for coupling any of skin 303, first member 1005, second member 1007, and panel 309 together. It should be appreciated that first member 1005 and second member 1007 may be of a wide variety of lengths, thicknesses, and orientations. Furthermore, first member 1005 and second member 1007 may include a wide variety of features, such as fillets and chamfers, to name a few.

Figure 11:
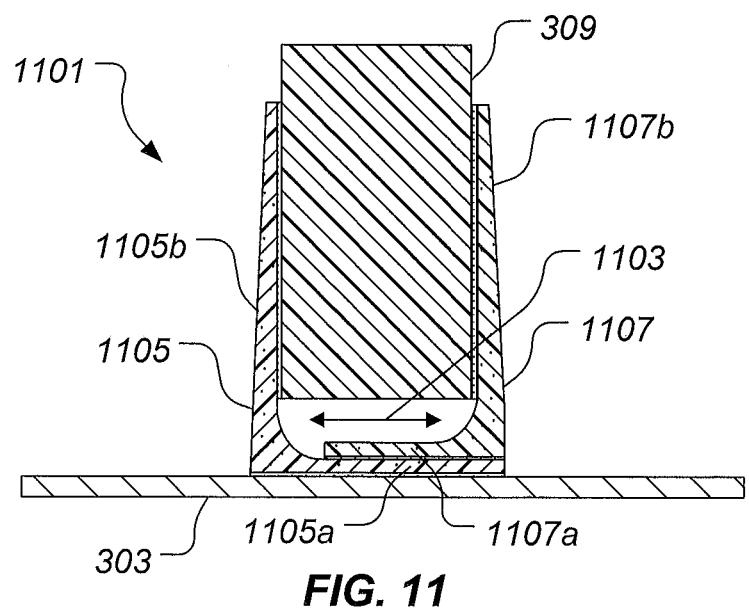
FIG. 11 is a cross-sectional view of a structural system, according to an alternative embodiment of present application.

Referring to FIG. 11, a system 1101 represents an alternative embodiment of system 301. System 1101 includes a first member 1105 and a second member 1107 which are each preferably "L" shaped. First member 1105 includes a base portion 1105a and a leg portion 1105b. Similarly, second member 1107 includes base portion 1107a and a leg portion 1107b. First member 1105 is bonded to skin 303 with an adhesive layer between base portion 1105a and skin 303. Second member 1107 is bonded to first member 1105 with an adhesive layer between base portion 1107a and base portion 1105a. During installation, first member 1105 and second member 1107 can be selectively located along a direction 1103 to accommodate a variety of panel 309 thicknesses. Fasteners may be used in lieu of, or supplemental to the adhesive for coupling any of skin 303, first member 1105, second member 1107, and panel 309 together. It should be appreciated that first member 1105 and second member 1107 may be of a wide variety of lengths, thicknesses, and orientations. Furthermore, first member 1105 and second member 1107 may include a wide variety of features, such as fillets and chamfers, to name a few.

Systems 301, 501, 601, 801, 901, 1001, and 1101 are configured so that adhesive layers may be customized to optimal bond line thickness, while also allowing for generous tolerance variances in panel 309. Customizing bond line thickness is important because certain adhesives may provide better strength at certain bond line thickness. Furthermore, certain adhesives may perform better when subjected to pressure during curing. Systems 301, 501, 601, 801, 901, 1001, and 1101 are configured so that pressure may be applied to the adhesive layers. Systems 301, 501, 601, 801, 901, 1001, and 1101 are also configured to minimize the shearing/smearing of adhesive layers during installation. For example, panel 309 can be installed so that panel 309 is pressed against an adjacent adhesive layer at a direction normal to the adhesive layer, thereby preventing the adhesive layer from smearing.

The system of the present application provides significant advantages, including: (1) access to surfaces of first member and second member for bond surface preparation; (2) access to surfaces of first member and second member for inspection prior to installation; (3) ability to use a variety of adhesives; (4) controlling and customization of bond line thickness; (5) ability to apply positive pressure to the adhesive layers during the curing procedure; (6) ability to accommodate part tolerances while maintaining desired bond line thicknesses; and (7) reducing the access required during installation.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A joint system for attaching a panel to a skin, the system comprising:
    a first member having a first leg portion, a first inner base portion, and a first outer base portion, the first outer base portion and the first inner base portion being coupled to the skin along a first bonding surface; and
    a second member having a second leg portion, a second inner base portion, and a second outer base portion, the second inner base portion and the second outer base portion of the second member being coupled to the first inner base portion of the first member;
    wherein the first inner base portion separates the second member from the skin, the first inner base portion extending underneath the second inner member and the second outer member of the second member, the first inner base portion being coupled to the second member along a second bonding surface;
    wherein the panel is coupled to the first leg portion and the second leg portion.

2. The joint system according to claim 1, wherein at least one of the first inner base portion, the first outer base portion, the second inner base portion, and the second outer base portion is tapered.

3. The joint system according to claim 1, wherein the first member and the second member are coupled to the skin with adhesive.

4. The joint system according to claim 1, wherein the first member and the second member are coupled to the skin with at least one fastener.

5. The joint system according to claim 1, wherein the panel is coupled to the first leg portion and the second leg portion with an adhesive.

6. The joint system according to claim 1, wherein the panel is coupled to the first leg portion and the second leg portion with at least one fastener.

7. The joint system according to claim 1, wherein the first member and the second member are approximately "T" shaped.

8. The joint system according to claim 1, further comprising:
    at least one fastener located through the first inner base portion, the second inner base portion, and the skin.

9. The joint system according to claim 1, wherein the skin is a panel structural member.

10. A joint system for attaching a panel to a skin, the system comprising:
    a first member having a first leg portion, a first inner base portion, and a first outer base portion, the first outer base portion and the first inner base portion being coupled to the skin along a first bonding surface; and
    a second member having a second leg portion, a second inner base portion, and a second outer base portion, the second outer base portion and the second inner base portion being coupled to the first inner base portion along a second bonding surface, second member being separated from the skin by the first member, the first inner portion extending underneath the outer base portion of the second member;
    wherein the panel is coupled to the first leg portion and the second leg portion; and;
    wherein the panel is capable of being coupled to the first leg portion and the second leg portion while the first bonding surface and the second bonding surface are in contact with the skin.

11. The joint system according to claim 10, further comprising:
    a gap between the first inner base portion and the second inner base portion.

12. The joint system according to claim 10, wherein the second inner base portion is approximately parallel to the first inner base portion.

13. The joint system according to claim 10, wherein the first member and the second member are approximately "T" shaped.

14. The joint system according to claim 10, wherein the panel is a structural member in an aircraft.

15. A method of assembling a structural joint system, comprising:
    coupling a first member to a skin so that the first member is rigidly associated with the skin, the first member comprising:
    a first base portion;
    a first leg portion extending from the first base portion;

preparing a second member for adhesive bonding, the second member comprising:
- a second base portion;
- a second leg portion extending from the second base portion;

bonding the second member to an upper surface of the first base portion such that the second base portion is separated from the skin, the first base portion extending between the second base portion and the skin; and bonding a structural member between the first leg portion and the second leg portion;

wherein while bonding the second member to the first member the first leg portion remains parallel to the second leg portion.

16. The method according to claim 15, wherein first leg portion and the first base portion are positioned approximately 90 degrees to each other.

17. The method according to claim 15, wherein the step of bonding the second member to the skin and to the first member, and step of bonding the structural member between the first leg portion and the second leg portion, occur approximately in the same procedure.

18. The method according to claim 15, wherein bonding the structural member between the first leg portion and the second leg portion involves using adhesive film and moving the second leg portion towards the first leg portion so as to prevent the adhesive film from being displaced.

19. The method according to claim 15, further comprising:
using a fastener between the overlapping portion of the first base portion and the second base portion in order to apply pressure during curing of an adhesive located there between.

* * * * *